Nov. 1, 1927.

J. L. HITCHCOCK ET AL 1,647,520

LIGHTING SWITCH FOR MOTOR VEHICLES

Filed Jan. 31, 1924

INVENTORS
John L. Hitchcock
Arthur R. Pangborn
BY
ATTORNEY

Patented Nov. 1, 1927.

1,647,520

UNITED STATES PATENT OFFICE.

JOHN L. HITCHCOCK, OF RAYLAND, OHIO, AND ARTHUR R. PANGBORN, OF WATKINS, NEW YORK.

LIGHTING SWITCH FOR MOTOR VEHICLES.

Application filed January 31, 1924. Serial No. 689,624.

This invention relates broadly to switch mechanisms, and more specifically to a switch for electric circuits to the lamps of motor vehicles.

The primary object of the invention is to provide in convenient positions upon the steering wheel of an automobile means whereby any of the various lighting circuits may be opened and closed by the operator without removal of the hands from the wheel.

Other objects will hereinafter be made apparent, reference being had to the accompanying drawings, in which—

Figure 1:
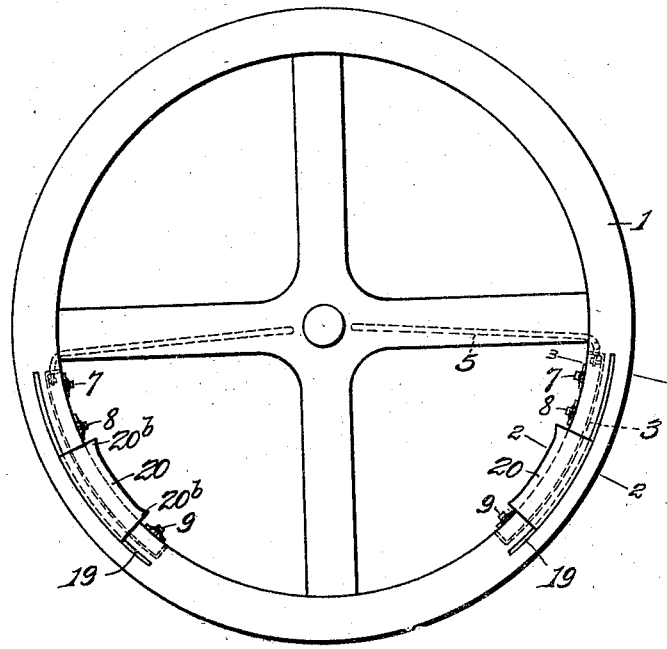

Figure 1 is a plan view of a steering wheel to which the invention is applied.

Figure 2:
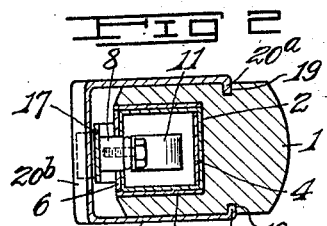
Figure 3:
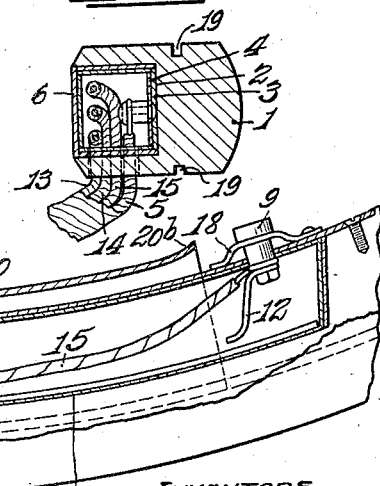

Figures 2 and 3 are enlarged cross sections taken on lines 2—2 and 3—3, Fig. 1; and—

Figure 4:
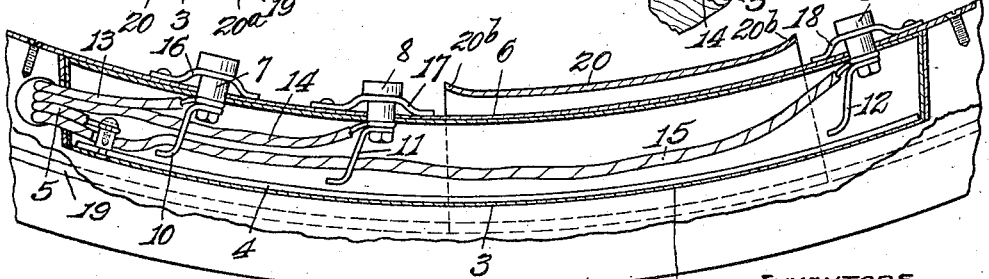

Figure 4 is an enlarged longitudinal section.

Referring to said drawings, 1 indicates the rim of a steering wheel constructed in accordance with our invention, the same having on opposite sides thereof and in convenient locations, as shown, means for closing the electric circuits to various lamps of the automobile, said means including a plurality of normally disengaged switch elements and a shiftable member whereby said elements may be selectively actuated into contact for closing said circuits.

Provided in the inner circumferential portion of the wheel rim 1 is a recess or channel 2 of suitable dimensions, which has therein a lining 3 of fiber or other insulating material; and mounted in overlying relation to the bottom lining of said channel is a metal contact strip 4 to which is attached a current conducting wire 5 leading from a storage battery (not shown) or other source of current.

Mounted upon the wheel 1 in closing relation to the channel 2 is a plate 6 through which are movable the stem portions of a plurality of posts, as 7, 8 and 9, of pushbutton type, which carry upon their inner ends contacts 10, 11 and 12, respectively, each of which is adapted to be actuated into contact with the contact strip 4 for closing an electric circuit to one or more of the lamps of the automobile. As herein shown, wires 13, 14 and 15, also leading from said source of current, are attached to the posts 7, 8 and 9, respectively.

Said posts have button-like heads having their under sides resting upon resilient depressible members, or springs, as 16, 17 and 18, which normally hold said posts elevated, or thrust outward, in a position wherein the thereto-attached contacts are withdrawn from engagement with the contact strip 4. Pressure applied to the outer end, or head, of any of said posts serves to depress the latter against the tension of its spring to the point at which its attached contact engages the strip 4.

As herein shown for illustrative purposes, the movable posts 7 and 8 are designed to be depressed, respectively, for closing the electric circuits to direction signal lamps carried on the rear end of the automobile and to the headlight lamps, while the post 9 is designed for actuation to close a circuit to a parking lamp carried by a rear fender or other appropriate part of the car. Further, as herein shown, the mechanism comprising the invention is employed in duplicate, one thereof at the left side and the other at the right side of the steering wheel, thereby to provide for independent lighting of the lamps employed on opposite sides of the car. It is to be understood, however, that other lamps, or other arrangements of lamps, may be employed, and that it is not positively essential that duplicate switching mechanisms be employed on the wheel.

Provided in the upper and under sides of the wheel rim 1 are longitudinal grooves 19 in which are slidably received the inturned lateral edges 20ᵃ of a shiftable saddle plate or member 20. Said saddle plate is designed to be shifted along the steering wheel rim in one direction into depressing relation either to the post 8 alone for closing the electric circuit to the therein included headlight lamp or lamps or to both said post 8 and the post 7, thereby to close both the headlight circuit and a circuit to a rear-end signal light for indicating the direction of travel. Shifted in the opposite direction, the saddle plate may be employed for depressing the post 9 for closing a third electric circuit, as to a parking lamp which may be located in any suitable position.

As herein shown, the shiftable member 20 is of approximately cylindrical form in cross section and has the ends of the post-engaging portion thereof outwardly inclined or floored, as shown at 20$^b$, to facilitate the movement of the member into depressing relation to the heads of the various posts.

The posts 8 and 9 are located adjacent to the opposite ends of the shiftable member 20. Thus, either the headlight lamps or the parking lamps, which, in service, are never lighted contemporarily, may be lighted by a slight longitudinal shifting movement of said member. The post 7 is located at the same side as the post 8 and at a somewhat greater distance from the member 20. Thus, when it is desired that the direction signal lamps be lighted, a slight shifting of the member 20 beyond the headlight circuit closing position will cause said member to also depress said post 7.

While we have herein shown and described a simple operative form of the invention, it is to be understood that various changes and modifications in the forms and arrangements of some of the parts, all within the scope of the appended claim, are contemplated.

What is claimed is—

In electric lamp switches for motor vehicles, a steering wheel having a recess in the rim thereof, a stationary contact located within said recess, a plate removably mounted in closing relation to said recess, a plurality of contact members carried by said plate normally disposed out of engagement with said contact and independently depressible through said plate into engagement with said contact for effecting closing of electric lamp circuits, and a rim-embracing member shiftable on said wheel rim for selectively depressing said contact members either singly or plurally, said rim-embracing member having its outer ends flared for riding over said contact members.

In testimony whereof we affix our signatures.

JOHN L. HITCHCOCK.
ARTHUR R. PANGBORN.